(12) United States Patent
Takayanagi et al.

(10) Patent No.: US 9,212,892 B2
(45) Date of Patent: Dec. 15, 2015

(54) STEERING ANGLE SENSOR

(71) Applicant: HITACHI AUTOMOTIVE SYSTEMS STEERING, LTD., Hiki-gun, Saitama (JP)

(72) Inventors: Naoki Takayanagi, Kawasaki (JP); Tatsuyoshi Maruyama, Atsugi (JP); Kiyotaka Shirakubo, Ayase (JP); Kohtaro Shiino, Isehara (JP)

(73) Assignee: HITACHI AUTOMOTIVE SYSTEMS STEERING, LTD, Saitama (JP)

( * ) Notice: Subject to any disclaimer, the term of this patent is extended or adjusted under 35 U.S.C. 154(b) by 3 days.

(21) Appl. No.: 14/132,352

(22) Filed: Dec. 18, 2013

(65) Prior Publication Data

US 2014/0208890 A1 Jul. 31, 2014

(30) Foreign Application Priority Data

Jan. 30, 2013 (JP) ................................. 2013-015973

(51) Int. Cl.
  B62D 5/04 (2006.01)
  B62D 15/02 (2006.01)
  G01B 5/24 (2006.01)

(52) U.S. Cl.
  CPC .............. G01B 5/24 (2013.01); B62D 15/0215 (2013.01); B62D 15/0245 (2013.01); B62D 5/04 (2013.01); Y10T 74/20834 (2015.01)

(58) Field of Classification Search
  CPC .......... B62D 5/04; B62D 5/0421; G01B 7/30; G01D 5/145; G01P 3/487
  USPC ................ 73/1.75, 865.9; 180/443, 444, 446; 324/173, 174, 207.12, 207.13, 207.21, 324/207.25; 362/40, 43; 701/41, 42
  See application file for complete search history.

(56) References Cited

U.S. PATENT DOCUMENTS

| 6,324,905 | B2 | 12/2001 | Noltemeyer et al. |
| 7,201,069 | B2 * | 4/2007 | Sakabe ...................... 73/862.31 |
| 7,424,858 | B2 * | 9/2008 | Matsuda et al. .......... 114/144 E |
| 8,047,066 | B2 * | 11/2011 | Kang et al. ................. 73/117.02 |
| 8,290,664 | B2 * | 10/2012 | Collet et al. ..................... 701/42 |
| 8,810,239 | B2 * | 8/2014 | Shin .......................... 324/207.22 |
| 2001/0013774 | A1 | 8/2001 | Noltemeyer et al. |
| 2004/0118220 | A1 * | 6/2004 | Takuma ................... 73/862.333 |
| 2005/0022613 | A1 * | 2/2005 | Sakabe ....................... 73/862.31 |
| 2007/0090830 | A1 * | 4/2007 | Shiraga et al. ........... 324/207.25 |

(Continued)

FOREIGN PATENT DOCUMENTS

JP 2001-505667 A 4/2001

*Primary Examiner* — Joseph Rocca
*Assistant Examiner* — Marc A Scharich
(74) *Attorney, Agent, or Firm* — Foley & Lardner LLP

(57) ABSTRACT

A steering angle sensor for a vehicle including a steering angle sensor housing, a first gear, a rotation transmitting portion, a second gear meshing with the first gear, a third gear meshing with the first gear or the second gear, first and second magnetoresistance effect elements to detect first and second rotation angles as rotation angles of the second and third gears, respectively, and a biasing member disposed in the steering angle sensor housing to bias the first gear toward the second gear, wherein the first and rotation angles are combined to determine an absolute steering angle indicative of an amount of rotation of a steering wheel when the steering wheel is rotated from a neutral position in which a steerable road wheel is oriented to a straight ahead direction of the vehicle.

19 Claims, 10 Drawing Sheets

(56) References Cited

U.S. PATENT DOCUMENTS

| | | | |
|---|---|---|---|
| 2008/0127755 A1* | 6/2008 | Kim | 73/865.9 |
| 2009/0013821 A1* | 1/2009 | Koma et al. | 74/575 |
| 2009/0289623 A1* | 11/2009 | Sano | 324/207.25 |
| 2010/0235054 A1* | 9/2010 | Hoskins et al. | 701/42 |
| 2013/0093415 A1* | 4/2013 | Moldenhauer | 324/207.25 |
| 2013/0147469 A1* | 6/2013 | Noda et al. | 324/207.25 |

* cited by examiner

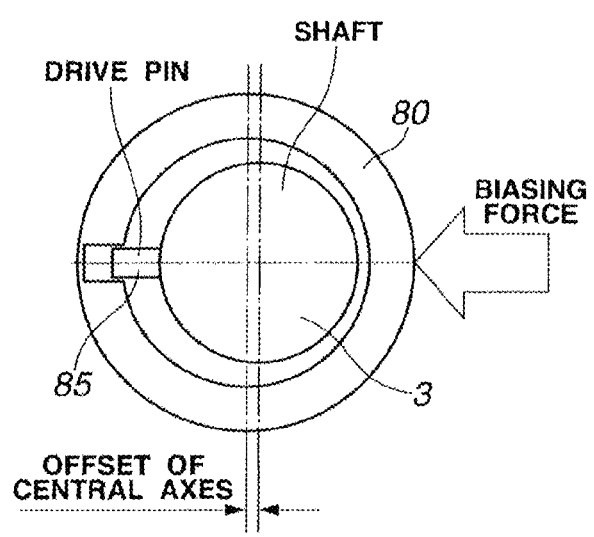
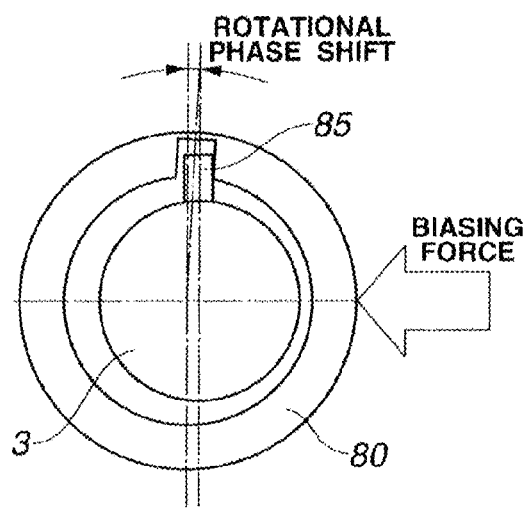
FIG. 9A
FIG. 9B
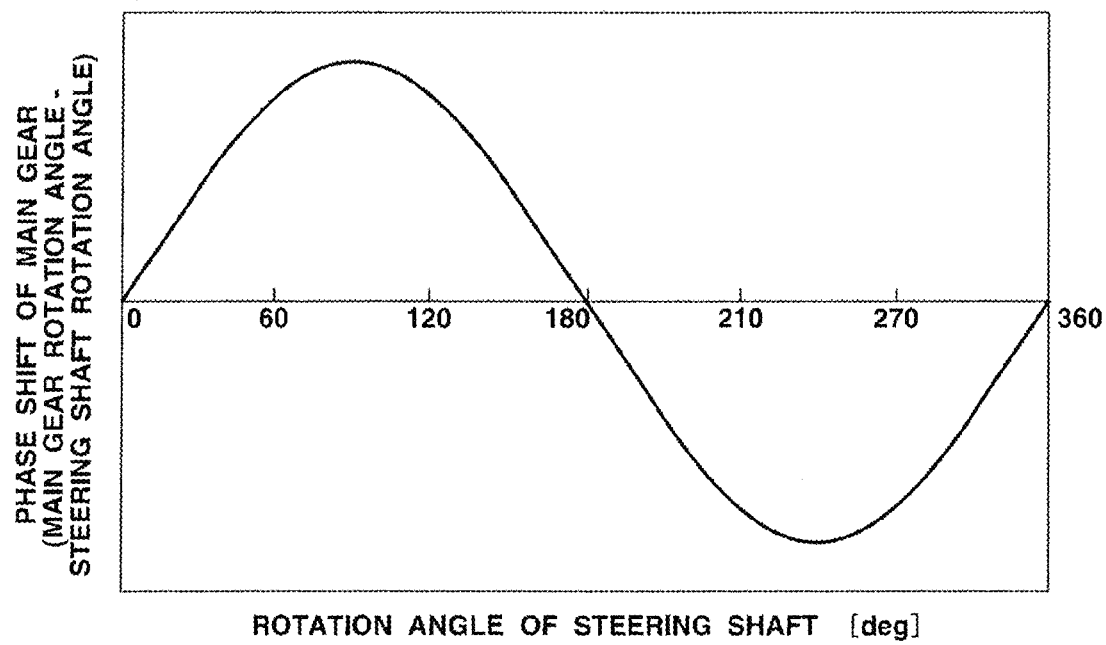
FIG. 10

STEERING ANGLE SENSOR

BACKGROUND OF THE INVENTION

The present invention relates to a steering angle sensor.

Japanese Patent Application Unexamined Publication No. P2001-505667 discloses a steering angle sensor including a gear (hereinafter referred to as a first gear) mounted on a steering shaft to make a unitary rotation therewith and two gears (hereinafter referred to as a second gear and a third gear) meshing with the first gear. The second and third gears are respectively equipped with magnets, and have numbers of teeth different from each other. The steering angle sensor can detect a rotation angle not less than 360 degrees on the basis of a difference between rotation angles of the second gear and the third gear which is generated because of the different numbers of teeth.

SUMMARY OF THE INVENTION

However, in the steering angle sensor of the above-described conventional art, there is such a fear that an error in detection of the rotation angle of the steering shaft is caused due to backlash between the first gear and the second gear and between the first gear and the third gear.

It is an object of the present invention to provide a steering angle sensor capable of reducing error in detection of a rotation angle of a steering shaft.

In a first aspect of the present invention, there is provided a steering angle sensor for a vehicle including:

a steering angle sensor housing disposed on a steering shaft that is rotated in accordance with an operation of a steering wheel;

a first gear rotatably disposed in the steering angle sensor housing, the first gear including an annular body portion formed to surround the steering shaft, a plurality of teeth formed on an outer peripheral side of the body portion, and an engaging portion formed in the body portion, the first gear having an inner peripheral surface configured to be spaced from the steering shaft at a predetermined distance in a radial direction thereof;

a rotation transmitting portion disposed on the steering shaft so as to make a unitary rotation with the steering shaft, the rotation transmitting portion having a counterpart engaging portion engaged with the engaging portion of the first gear to rotationally drive the first gear in accordance with rotation of the steering shaft;

a second gear rotatably disposed in the steering angle sensor housing, the second gear including a magnetic member having N pole and S pole disposed in a circumferential direction of the magnetic member at predetermined intervals, and a plurality of teeth formed on an outer peripheral side of the second gear to mesh with the plurality of teeth of the first gear;

a third gear rotatably disposed in the steering angle sensor housing, the third gear including a magnetic member having N pole and S pole disposed in a circumferential direction of the magnetic member at predetermined intervals, and a plurality of teeth formed on an outer peripheral side of the third gear to mesh with the plurality of teeth of the first gear or the plurality of teeth of the second gear in which a number of the plurality of teeth of the third gear is set to a value indivisible by a number of the plurality of teeth of the second gear to determine a predetermined speed reducing ratio;

a first magnetoresistance effect element that detects a first rotation angle as a rotation angle of the second gear by detecting a change of magnetic field generated by the magnetic member of the second gear to determine a change of resistance value of a resistance element;

a second magnetoresistance effect element that detects a second rotation angle as a rotation angle of the third gear by detecting a change of magnetic field generated by the magnetic member of the third gear to determine a change of resistance value of a resistance element; and a biasing member disposed in the steering angle sensor housing to bias the first gear toward the second gear so as to reduce a backlash between the first gear and the second gear, wherein the first rotation angle and the second rotation angle are combined to determine an absolute steering angle indicative of an amount of rotation of the steering wheel when the steering wheel is rotated from a neutral position in which a steerable road wheel is oriented to a straight ahead direction of the vehicle.

In a second aspect of the present invention, there is provided a steering angle sensor for a vehicle including:

a steering angle sensor housing disposed on a steering shaft that is rotated in accordance with an operation of a steering wheel;

a first gear rotatably disposed in the steering angle sensor housing, the first gear including an annular body portion formed to surround the steering shaft, a plurality of teeth formed on an outer peripheral side of the body portion, and an engaging portion formed in the body portion, the first gear having an inner peripheral surface configured to be spaced from the steering shaft at a predetermined distance in a radial direction thereof;

a rotation transmitting portion disposed on the steering shaft so as to make a unitary rotation with the steering shaft, the rotation transmitting portion having a counterpart engaging portion engaged with the engaging portion of the first gear to rotationally drive the first gear in accordance with rotation of the steering shaft;

a second gear rotatably disposed in the steering angle sensor housing, the second gear including a magnetic member having N pole and S pole disposed in a circumferential direction of the magnetic member at predetermined intervals, and a plurality of teeth formed on an outer peripheral side of the second gear to mesh with the plurality of teeth of the first gear;

a third gear rotatably disposed in the steering angle sensor housing, the third gear including a magnetic member having N pole and S pole disposed in a circumferential direction of the magnetic member at predetermined intervals, and a plurality of teeth formed on an outer peripheral side of the third gear to mesh with the plurality of teeth of the first gear in which a number of the plurality of teeth of the third gear is set to a value indivisible by a number of the plurality of teeth of the second gear to determine a predetermined speed reducing ratio;

a first magnetoresistance effect element that detects a first rotation angle as a rotation angle of the second gear by detecting a change of magnetic field generated by the magnetic member of the second gear to determine a change of resistance value of a resistance element;

a second magnetoresistance effect element that detects a second rotation angle as a rotation angle of the third gear by detecting a change of magnetic field generated by the magnetic member of the third gear to determine a change of resistance value of a resistance element; and a biasing member disposed in the steering angle sensor housing to bias the first gear in a direction in which the first gear meshes with both the second gear and the third gear so as to reduce a backlash between the first gear and the second gear and a backlash between the first gear and the third gear, wherein the first rotation angle and the second rotation angle are combined to determine an absolute steering angle indicative of an amount of rotation of the steering wheel when the steering wheel is rotated from a neutral position in which a steerable road wheel is oriented to a straight ahead direction of the vehicle.

The steering angle sensor according to the present invention can reduce error in detection of rotation angle of a steering shaft.

The other objects and features of this invention will become understood from the following description with reference to the accompanying drawings.

BRIEF DESCRIPTION OF THE DRAWINGS

FIG. 9A and FIG. 9B are schematic diagrams of a main gear of the steering angle sensor and the steering shaft according to the first embodiment of the present invention.

FIG. 10 is a graph showing phase shift that occurs when a central axis of the main gear and a central axis of the steering shaft are offset from each other.

DETAILED DESCRIPTION OF THE INVENTION

A steering angle sensor according to embodiments of the present invention will be explained hereinafter with reference to the accompanying drawings.

[First Embodiment]
[Construction of Power Steering Apparatus]

Figure 1:
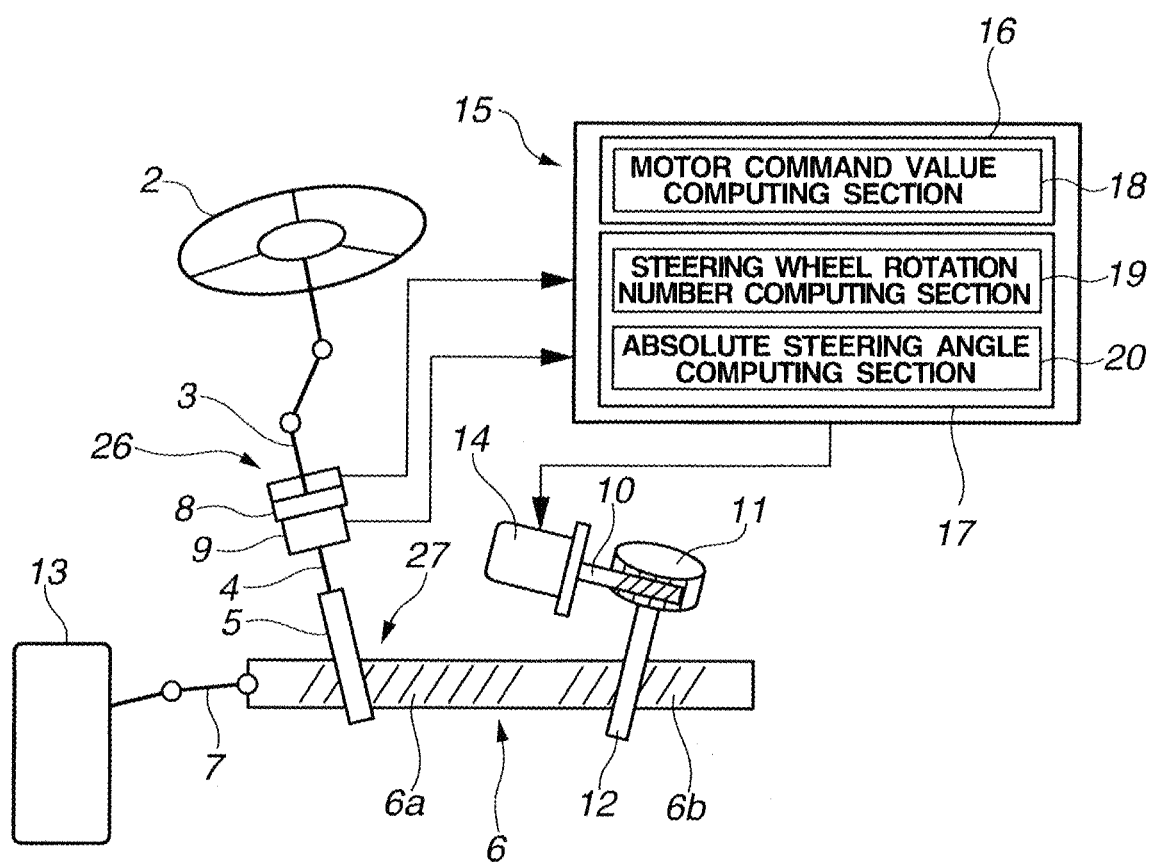
FIG. 1 is a schematic diagram of a power steering apparatus to which a steering angle sensor according to a first embodiment of the present invention is applied.

Referring to FIG. 1, a power steering apparatus for a vehicle to which a steering angle sensor according to a first embodiment of the present invention is applied is explained. FIG. 1 is a schematic diagram of power steering apparatus 1. As shown in FIG. 1, power steering apparatus 1 includes steering wheel 2, steering shaft 3 connected to steering wheel 2, output shaft 4 connected to steering shaft 3, first pinion shaft 5 connected to output shaft 4, rack bar 6 engaged with first pinion shaft 5, tie rod 7 connected to an end portion of rack bar 6, and steerable road wheel 13 connected to tie rod 7. First rack teeth 6a are formed in a portion of rack bar 6 which is engaged with pinion shaft 5. Torsion bar 22 is disposed between steering shaft 3 and output shaft 4 (see FIG. 2). Steering shaft 3 and output shaft 4 are constructed so as to be rotatable relative to each other in a range of torsional motion of torsion bar 22. Power steering apparatus 1 also includes a steering effort assisting mechanism serving to assist a steering effort of an operator of a vehicle which is applied to steering wheel 2. The steering effort assisting mechanism includes electric motor 14, worm shaft 10 connected to an output shaft of electric motor 14, worm wheel 11 engaged with worm shaft 10, and second pinion 12 connected to worm wheel 11. Second pinion 12 is engaged with second rack teeth 6b formed on rack bar 6.

Steering angle sensor 8 that detects an steering angle of steering wheel 2 is disposed on an outer periphery of steering shaft 3. Steering torque sensor 9 that detects steering torque inputted to steering wheel 2 is disposed between steering shaft 3 and output shaft 4.

Power steering apparatus 1 also includes electronic control unit 15 that serves to control electric motor 14.

Electronic control unit 15 includes electronic motor-control unit 16 and electronic sensor-control unit 17. Electronic motor-control unit 16 includes motor command value computing section 18 that computes a command current value to be supplied to electric motor 14 on the basis of the steering torque detected by steering torque sensor 9. Electronic sensor-control unit 17 includes steering wheel rotation number computing section 19 and absolute angle computing section 20. Steering wheel rotation number computing section 19 computes a steering wheel rotation number (or steering handle rotation number) indicative of a number of rotation of steering wheel 2 when steering wheel 2 is rotated from a neutral position of steering wheel 2 in which steerable road wheel 13 is oriented to a straight ahead direction of the vehicle. Absolute steering angle computing section 20 computes an absolute steering angle that is an amount of rotation of steering wheel 2 when steering wheel 2 is rotated from the neutral position thereof.

[Construction of Steering Angle Sensor]

Figure 2:
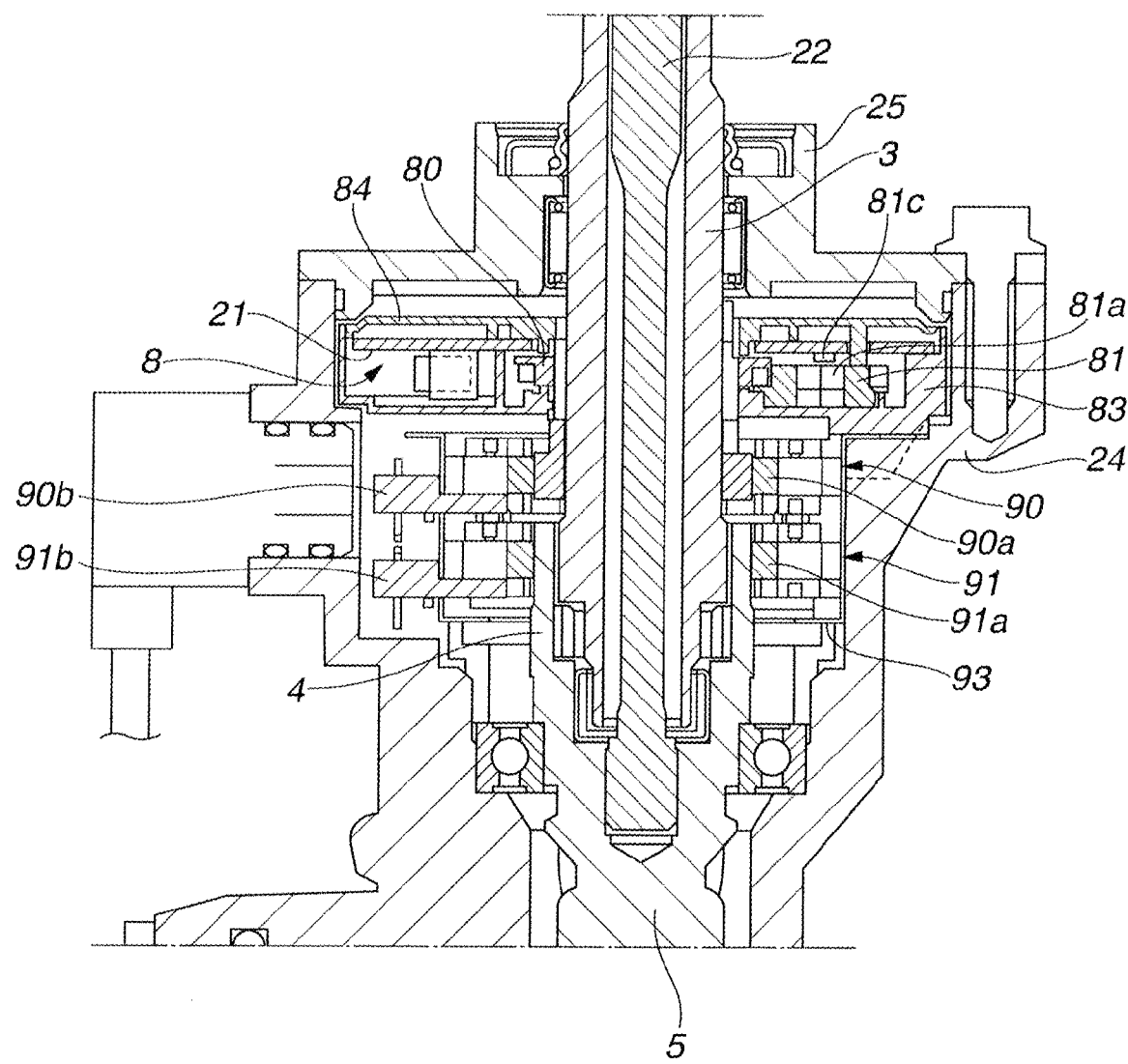
FIG. 2 is a sectional view of a part of the power steering apparatus shown in FIG. 1 to which the steering angle sensor according to the first embodiment of the present invention and a steering torque sensor are mounted.
Figure 3:
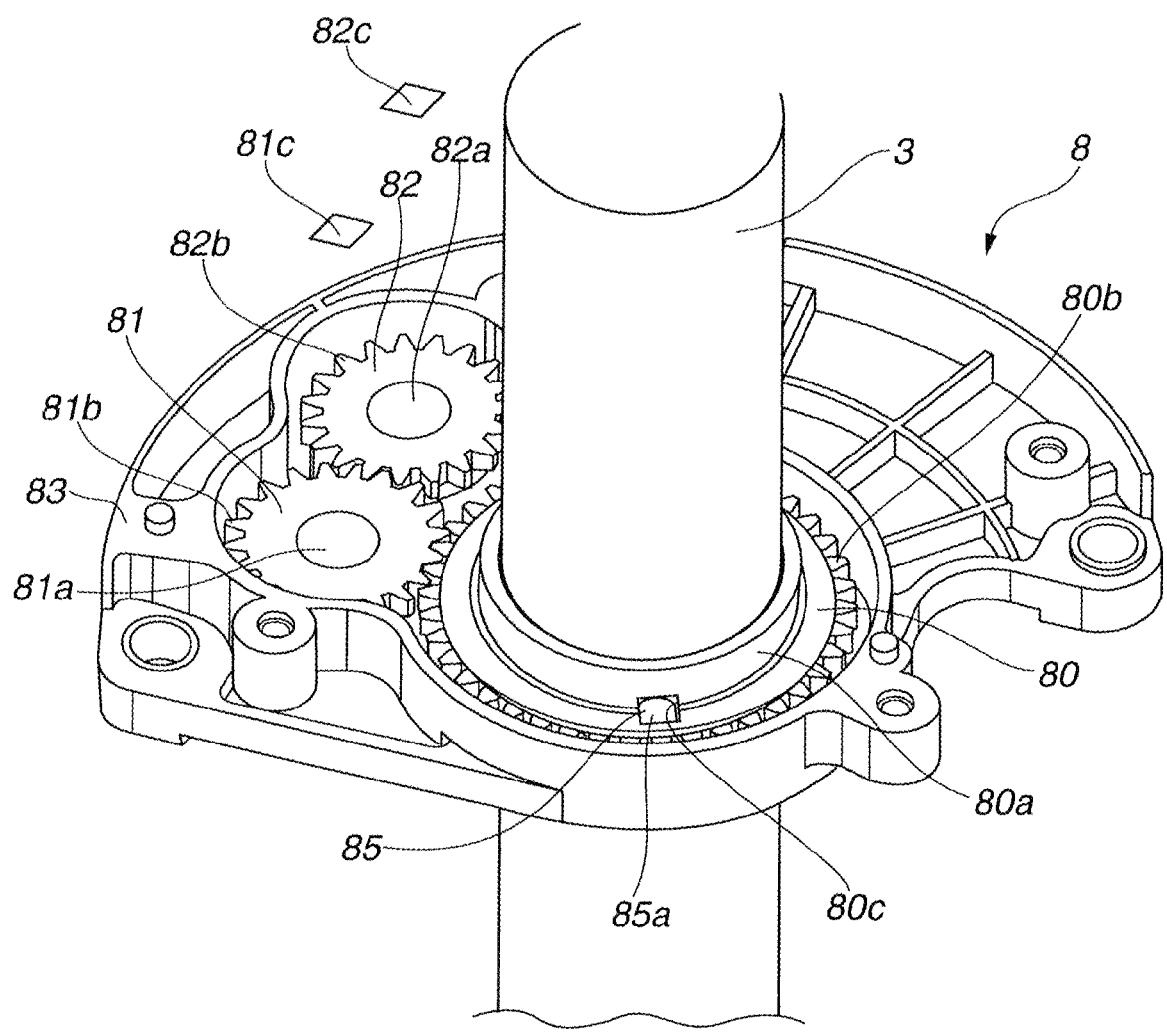
FIG. 3 is an exploded perspective view of the steering angle sensor according to the first embodiment of the present invention.
Figure 4:
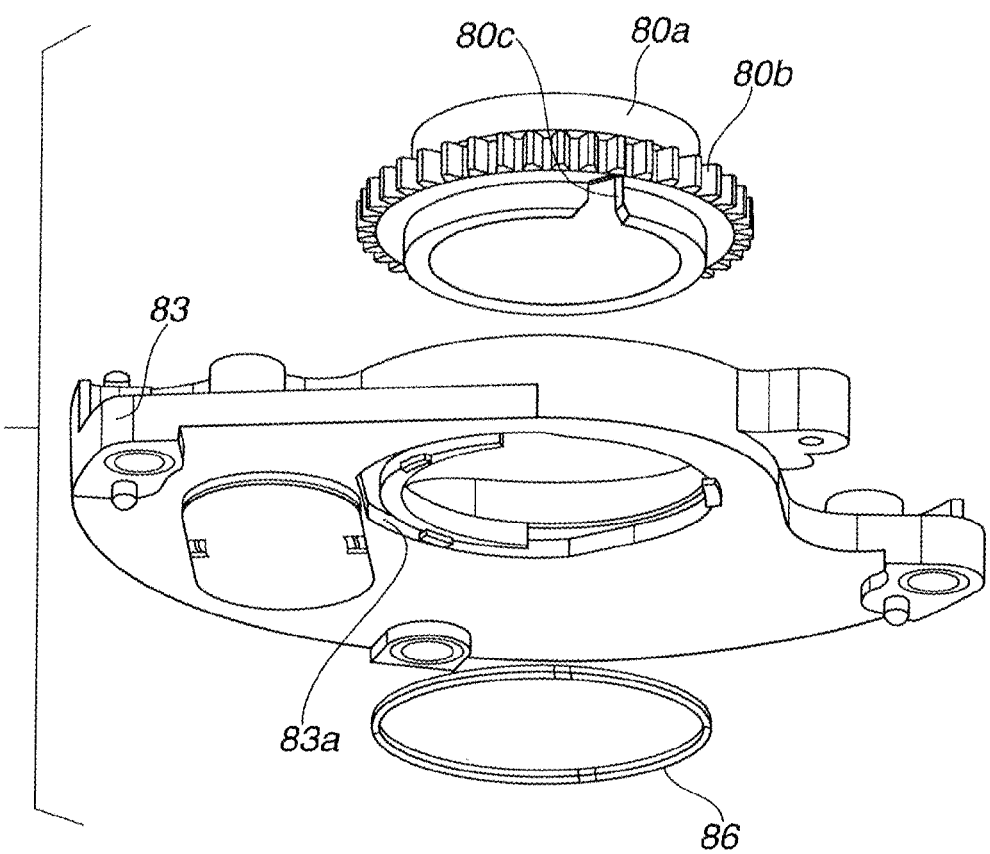
FIG. 4 is an exploded perspective view of the steering angle sensor according to the first embodiment of the present invention as viewed from an opposite side of FIG. 3.
Figure 5:
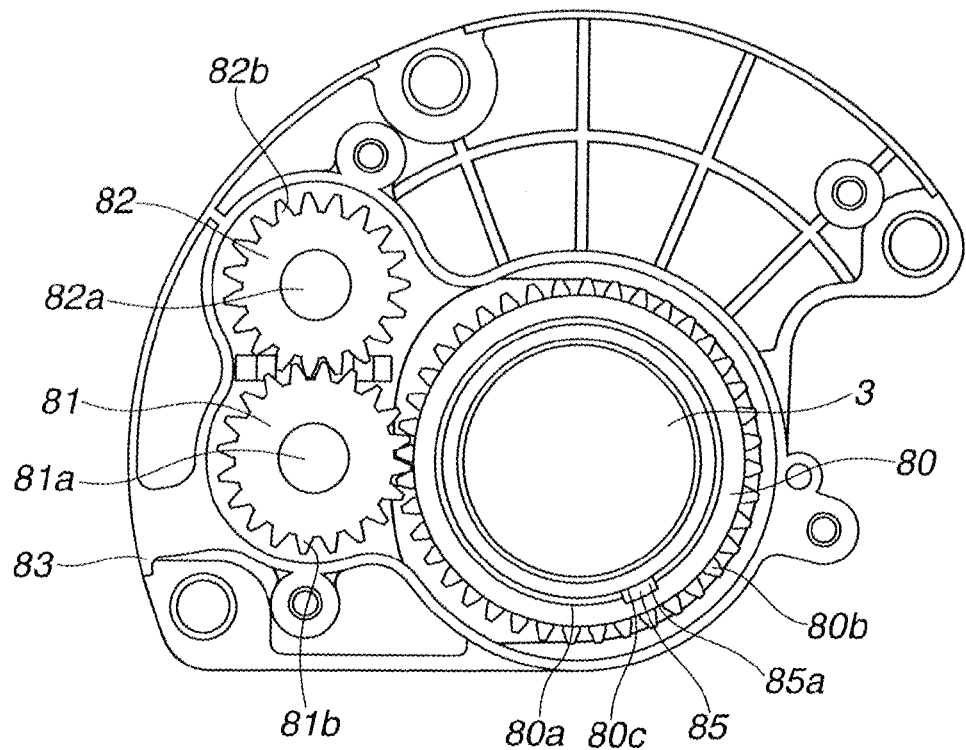
FIG. 5 is a diagram of the steering angle sensor according to the first embodiment of the present invention as viewed from one side in an axial direction of the steering shaft.
Figure 6:
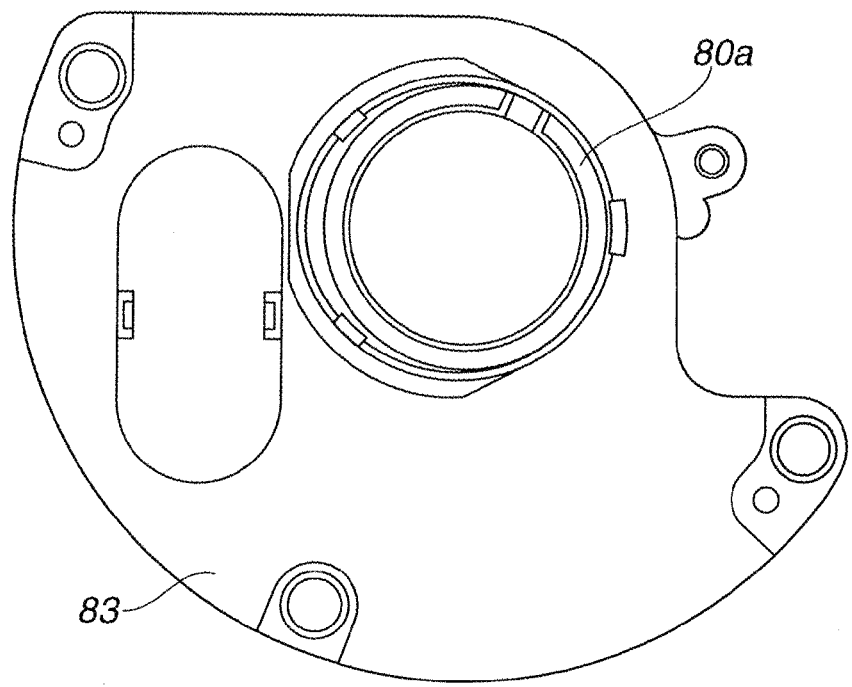
FIG. 6 is a diagram of the steering angle sensor according to the first embodiment of the present invention as viewed from an opposite side in the axial direction of the steering shaft.

FIG. 2 is a sectional view of steering angle sensor 8 and steering torque sensor 9 which are mounted to a part of steering shaft 3. FIG. 3 is an exploded perspective view of steering angle sensor 8. FIG. 4 is an exploded perspective view of steering angle sensor 8 as viewed from an opposite side of FIG. 3. FIG. 5 is a diagram of steering angle sensor 8 as viewed in an axial direction of steering shaft 3. FIG. 6 is a diagram of steering angle sensor 8 as viewed from an opposite side of FIG. 5 in the axial direction of steering shaft 3. Construction of steering angle sensor 8 is mainly explained hereinafter.

Steering angle sensor 8 includes main gear 80 disposed to make a unitary rotation with steering shaft 3, primary detection gear 81 meshing with main gear 80 and secondary detection gear 82 meshing with primary detection gear 81.

Main gear 80 is rotatably disposed in steering angle sensor housing 83. Specifically, main gear 80 is rotatably mounted to a bottom wall of steering angle sensor housing 83 through a cylindrical through hole formed in the bottom wall. Main gear 80 includes annular body portion 80*a* having an inner diameter larger than an outer diameter of steering shaft 3. Toothed portion 80*b* having a plurality of spur teeth is formed on an outer peripheral side of body portion 80*a*. For instance, toothed portion 80*b* has forty teeth. Toothed portion 80*b* is located in an intermediate portion of body portion 80*a* in an axial direction of body portion 80*a*. Body portion 80*a* includes engaging portion 80*c* provided in the form of a notch that extends from one axial end of body portion 80*a* in the axial direction of body portion 80*a*.

Steering shaft 3 extends through a through hole of body portion 80*a* of main gear 80. Steering shaft 3 is provided with drive pin 85 projecting from an outer periphery of steering shaft 3. Drive pin 85 has a distal end portion forming counterpart engaging portion 85*a* that is inserted into engaging portion 80*c* of body portion 80*a* of main gear 80. When steering shaft 3 is rotated, a side surface of counterpart engaging portion 85*a* of drive pin 85 is contacted with a side surface of engaging portion 80*c* to thereby rotationally drive main gear 80.

Primary detection gear 81 is rotatably disposed in steering angle sensor housing 83. Magnetic member 81*a* having a pair of N pole and S pole is mounted to primary detection gear 81. Magnetic member 81*a* may include not less than two pairs of N pole and S pole such that the N pole and the S pole are alternately arranged in a circumferential direction of magnetic member 81*a* and spaced from each other at predetermined intervals. Primary detection gear 81 includes toothed portion 81*b* formed on an outer periphery of primary detection gear 81. Toothed portion 81*b* has a plurality of teeth, for instance, twenty teeth. Toothed portion 81*b* meshes with toothed portion 80*b* of main gear 80.

As shown in FIG. 3, secondary detection gear 82 is rotatably disposed in steering angle sensor housing 83. Magnetic member 82*a* having a pair of N pole and S pole is mounted to secondary detection gear 82. Magnetic member 82*a* may include not less than two pairs of N pole and S pole such that the N pole and the S pole are alternately arranged in a circumferential direction of magnetic member 82*a* and spaced from each other at predetermined intervals. Secondary detection gear 82 includes toothed portion 82*b* formed on an outer periphery of secondary detection gear 82. Toothed portion 82*b* has a number of teeth which is indivisible by a number of teeth of toothed portion 81*b* of primary detection gear 81. For instance, toothed portion 82*b* has nineteen teeth. Toothed portion 82*b* meshes with toothed portion 81*b* of primary detection gear 81.

As shown in FIGS. 2 and 3, magnetoresistance effect element (MR element) 81*c* is disposed on substrate 21 so as to be opposed to magnetic member 81*a* in an axial direction of primary detection gear 81. Magnetoresistance effect element 81*c* detects a change of magnetic field generated between the N pole and the S pole of magnetic member 81*a* to determine a change of resistance value of the resistance element. On the other hand, magnetoresistance effect element (MR element) 82*c* is disposed on substrate 21 so as to be opposed to magnetic member 82*a* in an axial direction of secondary detection gear 82. Magnetoresistance effect element 82*c* detects a change of magnetic field generated between the N pole and the S pole of magnetic member 82*a* to determine a change of resistance value of the resistance element. The respective elements of steering angle sensor 8 are accommodated in steering angle sensor housing 83. Steering angle sensor housing 83 has an open end located in the axial direction of steering shaft 3 and closed by steering angle sensor cover 84. Upon assembling, the respective elements of steering angle sensor 8 are accommodated in steering angle sensor housing 83, and substrate 21 is disposed on a side of the open end of steering angle sensor housing 83. After that, the open end is closed by steering angle sensor cover 84.

As shown in FIG. 4, coil spring 86 is disposed in the bottom wall of steering angle sensor housing 83 on an opposite side of main gear 80 in an axial direction of the through hole of steering angle sensor housing 83. A part of coil spring 86 is engaged in engaging groove 83*a* formed in an outer periphery of the through hole of steering angle sensor housing 83. Engaging groove 83*a* extends along approximately a half of the outer periphery of the through hole which is located on a side of primary detection gear 81. A part of coil spring 86 which is located on an opposite side of the part engaged in engaging groove 83*a* is engaged at an inner periphery thereof with an outer peripheral surface of body portion 80*a* of main gear 80. That is, coil spring 86 is disposed so as to surround the outer periphery of body portion 80*a* of main gear 80. Coil spring 86 has an elastic force such that a diameter of coil spring 86 is reduced under a condition that coil spring 86 is engaged with engaging groove 83*a* and body portion 80*a* of main gear 80.

With the above construction, main gear 80 is biased toward primary detection gear 81. A rotation axis of main gear 80 is aligned with a rotation axis of steering shaft 3 under a condition that main gear 80 is biased by coil spring 86. However, it is not required to completely align the rotation axis of main gear 80 with the rotation axis of steering shaft 3. The rotation axis of main gear 80 may be located sufficiently close to the rotation axis of steering shaft 3 by the biasing force of coil spring 86, as compared to the rotation axis of main gear 80 located before main gear 80 is biased by coil spring 86. Further, main gear 80 is configured such that an inner periphery of body portion 80*a* is out of contact with an outer periphery of steering shaft 3 except for drive pin 85 under a condition that main gear 80 is biased by coil spring 86.

[Construction of Steering Torque Sensor]

Referring to FIG. 2, a construction of steering torque sensor 9 is now explained. Steering torque sensor 9 includes primary resolver 90 that detects a rotation angle of steering shaft 3, and secondary resolver 91 that detects a rotation angle of output shaft 4. Primary resolver 90 includes primary rotor 90*a* that makes unitary rotation with steering shaft 3, and primary stator 90*b* disposed on a radial outside of primary rotor 90*a* in an opposed relation thereto. Secondary resolver 91 includes secondary rotor 91*a* that makes unitary rotation with output shaft 4, and secondary stator 91*b* disposed on a radial outside of secondary rotor 91*a* to detect a rotation angle of output shaft 4.

Primary rotor 90*a* and secondary rotor 91*a* are accommodated in steering torque sensor case 93. Steering torque sensor case 93 has an open end located in the axial direction of steering shaft 3 and closed by the bottom wall of steering angle sensor housing 83. Primary stator 90*b* and secondary stator 91*b* are mounted to steering torque sensor case 93. Steering angle sensor 8 and steering torque sensor 9 are accommodated in gear housing 24 together with first pinion shaft S. Gear housing 24 has an open end that is located in the axial direction of steering shaft 3 and closed by gear cover 25.

[Determination of Steering Angle]

Figure 7:
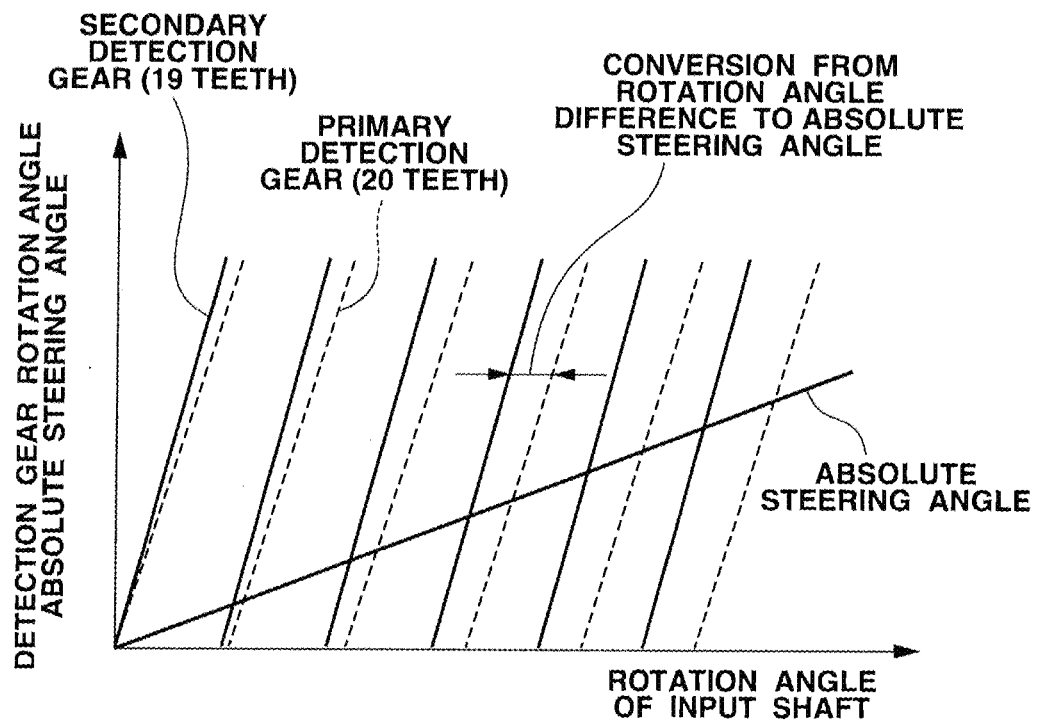
FIG. 7 is a graph showing a relationship between rotation angle of the steering shaft and rotation angles of a primary detection gear and a secondary detection gear in the first embodiment of the present invention.

FIG. 7 is a graph showing a relationship between rotation angle of steering shaft 3 and rotation angles of primary detection gear 81 and secondary detection gear 82 of the steering angle sensor according to the first embodiment of the present invention. Magnetoresistance effect elements 81c, 82c detect changes of magnetic fields of magnetic members 81a, 82a which occur corresponding to rotational positions of primary detection gear 81 and secondary detection gear 82 to thereby determine changes of magnetic resistance (reluctance), and output the detected changes of magnetic resistance as a sine wave signal or a cosine wave signal, respectively. In FIG. 7, there is shown information concerning the rotation angle converted from the sine wave signal or the cosine wave signal.

As shown in FIG. 7, secondary detection gear 82 having nineteen teeth makes one revolution or more during one revolution of primary detection gear 81 having twenty teeth. As a revolution number of secondary detection gear 82 becomes larger until the revolution number thereof reaches twenty, a difference in revolution number between primary detection gear 81 and secondary detection gear 82 is increased. The revolution number of primary detection gear 81 can be detected based on the difference in revolution number. A rotation angle of primary detection gear 81 within an angular range of 360 degrees can be detected on the basis of the rotation of primary detection gear 81 itself. Accordingly, the revolution number of primary detection gear 81 and a fine rotation angle of primary detection gear 81 within the angular range of 360 degrees can be detected to thereby determine an absolute steering angle (an angle including a rotation angle of not less than 360 degrees of steering shaft 3).

[Functions]
[Reduction of Backlash]

In order to perform accurate detection of a rotation angle of each of primary detection gear 81 and secondary detection gear 82, a distance between magnetic member 81a and magnetoresistance effect element 81c and a distance between magnetic member 82a and magnetoresistance effect element 82c must be constant. Therefore, it is necessary to suppress lean of primary detection gear 81 and secondary detection gear 82 which is caused due to input of a large force to primary detection gear 81 and secondary detection gear 82. Steering shaft 3 tends to be occasionally deformed to lean due to a steering reaction force. In order to prevent a force caused upon the deformation of steering shaft 3 from being transmitted to primary detection gear 81 through main gear 80, in the steering angle sensor of the first embodiment of the present invention, main gear 80 is configured such that a clearance between the inner periphery of main gear 80 and the outer periphery of steering shaft 3 is generated even under a condition that a distance between main gear 80 and primary detection gear 81 is minimum. However, main gear 80 can be moved by the clearance. Therefore, when main gear 80 is moved to separate from primary detection gear 81, a backlash between main gear 80 and primary detection gear 81 becomes large to cause increase in error in detection of rotation angle of steering shaft 3.

Figure 8:
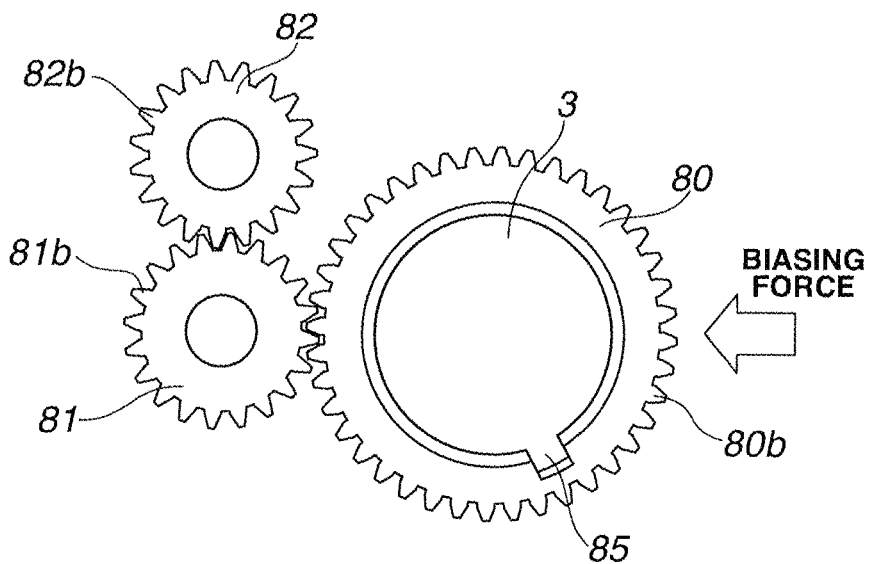
FIG. 8 is a schematic diagram of the steering angle sensor according to the first embodiment of the present invention.

In order to reduce the backlash, in the steering angle sensor of the first embodiment of the present invention, main gear 80 is biased in a direction in which main gear 80 comes into meshing engagement with primary detection gear 81, using coil spring 86. FIG. 8 is a schematic diagram of steering angle sensor 8 according to the first embodiment of the present invention. By biasing main gear 80 in the direction in which main gear 80 comes into meshing engagement with primary detection gear 81, it is possible to suppress the backlash between main gear 80 and primary detection gear 81 and therefore reduce error in detection of rotation angle of steering shaft 3.

[Alignment of Central Axis of Main Gear with Central Axis of Steering Shaft]

FIG. 9A and FIG. 9B are schematic diagrams of main gear 80 and steering shaft 3. FIG. 10 is a graph showing rotational phase shift of main gear 80 relative to steering shaft 3 (rotational phase difference between main gear 80 and steering shaft 3) which occurs when a central axis of main gear 80 and a central axis of steering shaft 3 are offset from each other.

When steering shaft 3 is rotated in such a state that the central axis of main gear 80 and the central axis of steering shaft 3 are offset from each other, there occurs no rotational phase shift of main gear 80 if drive pin 85 is located parallel with the biasing direction of coil spring 86 (i.e., at an angle of 0 degree or 180 degrees). On the other hand, if drive pin 85 is located perpendicular to the biasing direction of coil spring 86 (i.e., at an angle of 90 degrees or 270 degrees), the rotational phase shift of main gear 80 becomes maximum. That is, there occurs a difference in rotational phase between main gear 80 and steering shaft 3, thereby causing an error in detection of rotation angle of steering shaft 3.

In order to reduce the error in detection of rotation angle of steering shaft 3, in the steering angle sensor according to the first embodiment of the present invention, the rotation axis of main gear 80 is allowed to be in alignment with the rotation axis of steering shaft 3 under a condition that main gear 80 is biased in the direction in which main gear 80 comes into meshing engagement with primary detection gear 81 by coil spring 86. With this construction, a rotational phase shift of main gear 80 relative to steering shaft 3 can be suppressed, so that an error in detection of rotation angle of steering shaft 3 can be reduced.

[Ensuring Engagement Between Main Gear and Primary Detection Gear]

Even when main gear 80 is biased toward primary detection gear 81 by coil spring 86, there is such a fear that in a case where the inner periphery of main gear 80 is contacted with the outer periphery of steering shaft 3 before proper engagement of main gear 80 with primary detection gear 81 is accomplished, main gear 80 cannot be further moved toward primary detection gear 81 so that a backlash therebetween cannot be reduced.

In order to ensure the engagement of main gear 80 with primary detection gear 81, in the steering angle sensor according to the first embodiment of the present invention, contact between the inner periphery of main gear 80 and the outer periphery of steering shaft 3 is prevented under a condition that main gear 80 is biased toward primary detection gear 81 by coil spring 86. With this construction, it is possible to suppress a backlash between main gear 80 and primary detection gear 81 and thereby reduce error in detection of rotation angle of steering shaft 3.

[Enhancement of Accuracy in Detection of Rotation Angle]

Since rotation of main gear 80 is transmitted to secondary detection gear 82 through primary detection gear 81, an error in detection of the rotation angle of steering shaft 3 through secondary detection gear 82 tends to be larger than an error in detection of the rotation angle of steering shaft 3 through primary detection gear 81 directly meshing with main gear 80.

Therefore, in the steering angle sensor according to the first embodiment of the present invention, information concerning the rotation angle of secondary detection gear 82 is used merely to detect a number of revolution of primary detection gear 81, and information concerning the rotation angle of primary detection gear 81 within the angular range of 360 degrees is used to detect a fine rotation angle of steering shaft 3. As a result, it is possible to enhance accuracy in detection of the rotation angle of steering shaft 3.

[Reduction of Installation Volume of Coil Spring]

In the steering angle sensor according to the first embodiment of the present invention, coil spring 86 is disposed to surround body portion 80a of main gear 80 such that coil spring 86 is compressed to reduce a diameter thereof to thereby bias main gear 80 toward primary detection gear 81. With this construction, it is possible to reduce an installation volume of coil spring 86.

[Facilitation of Setting of Biasing Force Applied to Main Gear]

In the steering angle sensor according to the first embodiment of the present invention, secondary detection gear 82 meshes with primary detection gear 81 so that rotation of main gear 80 is transmitted to secondary detection gear 82 through primary detection gear 81. With this construction, it is possible to set magnitude and direction of the biasing force of coil spring 86 by taking into consideration only the meshing engagement between main gear 80 and primary detection gear 81. As a result, the setting of the biasing force can be facilitated.

[Effects]

(1) The steering angle sensor for a vehicle according to the first embodiment of the present invention includes steering angle sensor housing 83 disposed on steering shaft 3 that is rotated in accordance with an operation of steering wheel 2; main gear (first gear) 80 rotatably disposed in steering angle sensor housing 83, the main gear including annular body portion 80a formed to surround steering shaft 3, a plurality of teeth (toothed portion) 80b formed on an outer peripheral side of body portion 80a, and engaging portion 80c formed in body portion 80a, the main gear 80 having an inner peripheral surface configured to be spaced from steering shaft 3 at a predetermined distance in a radial direction thereof; drive pin (rotation transmitting portion) 85 disposed on steering shaft 3 so as to make a unitary rotation with steering shaft 3, the drive pin 85 having counterpart engaging portion 85a engaged with engaging portion 80c of main gear 80 to rotationally drive main gear 80 in accordance with rotation of steering shaft 3; primary detection gear (second gear) 81 rotatably disposed in steering angle sensor housing 83, the primary detection gear 81 including magnetic member 81a having N pole and S pole disposed in a circumferential direction of magnetic member 81a at predetermined intervals, and a plurality of teeth (toothed portion) 81b formed on an outer peripheral side of primary detection gear 81 to mesh with teeth 80b of main gear 80; secondary detection gear (third gear) 82 rotatably disposed in steering angle sensor housing 83, the secondary detection gear 82 including magnetic member 82a having N pole and S pole disposed in a circumferential direction of magnetic member 82a at predetermined intervals, and a plurality of teeth (toothed portion) 82b formed on an outer peripheral side of secondary detection gear 82 to mesh with teeth 81b of primary detection gear 81 in which a number of the plurality of teeth 82b is set to a value indivisible by a number of the plurality of teeth 81b of primary detection gear 81 to determine a predetermined speed reducing ratio; magnetoresistance effect element (first MR element) 81c that detects a first rotation angle as a rotation angle of primary detection gear 81 by detecting a change of magnetic field generated by magnetic member 81a to determine a change of resistance value of a resistance element; magnetoresistance effect element (second MR element) 82c that detects a second rotation angle as a rotation angle of secondary detection gear 82 by detecting a change of magnetic field generated by magnetic member 82a to determine a change of resistance value of a resistance element; and coil spring (biasing member) 86 disposed in steering angle sensor housing 83 to bias main gear 80 toward primary detection gear 81 so as to reduce a backlash between main gear 80 and primary detection gear 81, wherein the first rotation angle and the second rotation angle are combined to determine an absolute steering angle indicative of an amount of rotation of steering wheel 2 when steering wheel 2 is rotated from a neutral position in which steerable road wheel 13 is oriented to a straight ahead direction of the vehicle. With this construction, main gear 80 is biased in the direction in which main gear 80 comes into meshing engagement with primary detection gear 81, so that the backlash therebetween can be suppressed to thereby reduce an error in detection of rotation angle of steering shaft 3.

(2) Main gear 80 is disposed such that the rotation axis of main gear 80 after being biased by coil spring 86 is located closer to the rotation axis of steering shaft 3 than the rotation axis of main gear 80 before being biased by coil spring 86. With this construction, a rotational phase difference between main gear 80 and steering shaft 3 can be suppressed to thereby reduce an error in detection of rotation angle of steering shaft 3.

(3) Body portion 80a of main gear 80 is configured to be out of contact with steering shaft 3 under a condition that main gear 80 is biased by coil spring 86. With this construction, it is possible to suppress a backlash between main gear 80 and primary detection gear 81 and ensure meshing engagement therebetween. As a result, an error in detection of rotation angle of steering shaft 3 can be reduced.

(4) The second rotation angle is used to determine a number of rotation of steering shaft 3 when rotated from the neutral position of steering shaft 3, and the first rotation angle is used to determine a rotation angle of steering shaft 3 within one revolution of steering shaft 3. With this construction, it is possible to enhance accuracy in detection of the rotation angle of steering shaft 3.

(5) Coil spring 86 is formed into an annular shape to surround the outer periphery of body portion 80a of main gear 80. Coil spring 86 is contacted with body portion 80a on one peripheral portion side thereof and engaged with steering angle sensor housing 83 on the other peripheral portion side thereof located diametrically opposed to the one peripheral portion side in a circumferential direction of coil spring 86. Coil spring 86 biases main gear 80 toward primary detection gear 81 by applying an elastic force to main gear 80 in such a manner that a diameter of coil spring 86 is reduced. With this construction, it is possible to reduce an installation volume of coil spring 86.

(6) Secondary detection gear 82 meshes with primary detection gear 81 to be rotationally driven. Therefore, it is possible to set magnitude and direction of the biasing force of coil spring 86 by taking into consideration only the meshing engagement between main gear 80 and primary detection gear 81. As a result, the setting of the biasing force can be facilitated.

[Second Embodiment]

Figure 11:
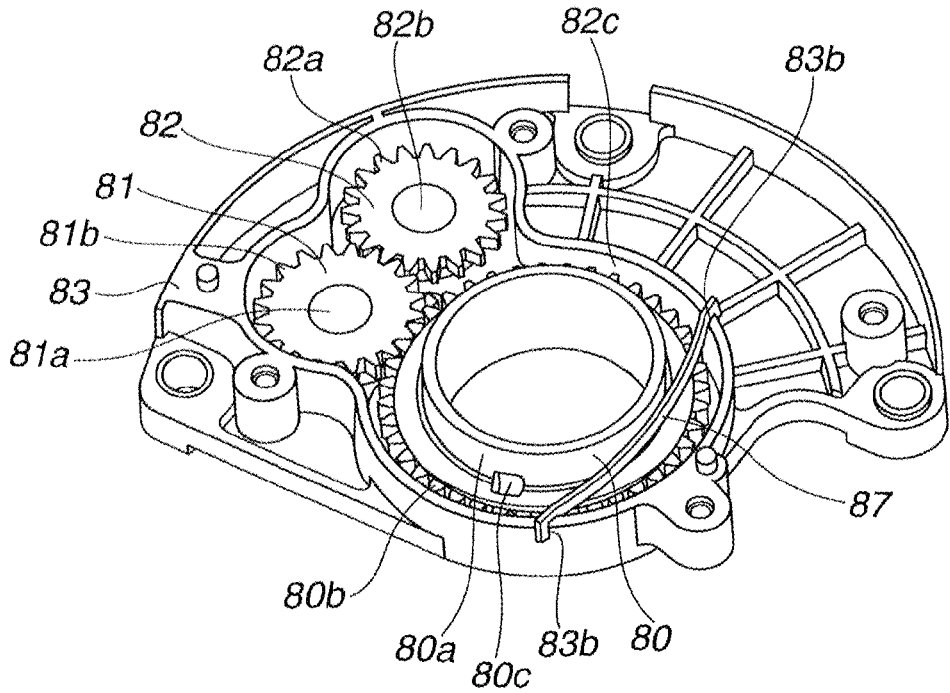
FIG. 11 is an exploded perspective view of a steering angle sensor according to a second embodiment of the present invention.
Figure 12:
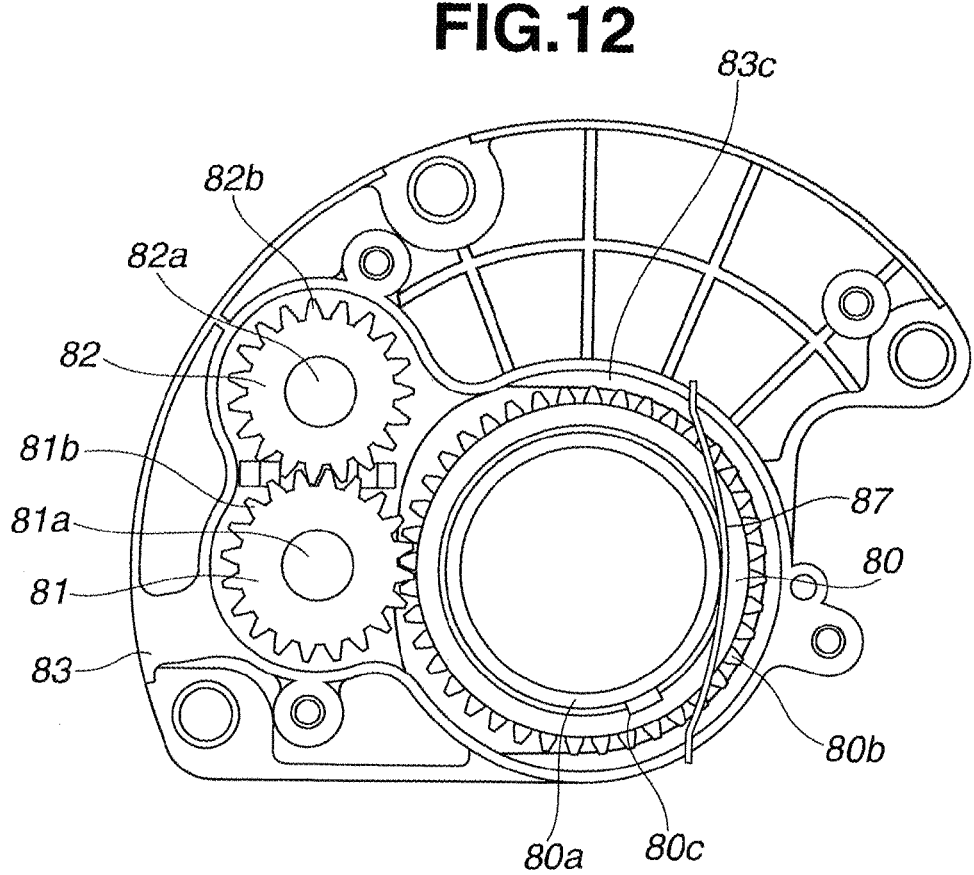
FIG. 12 is a diagram of the steering angle sensor according to the second embodiment of the present invention as viewed in an axial direction of the steering shaft.

Referring to FIG. 11 and FIG. 12, a steering angle sensor according to a second embodiment of the present invention is explained. The second embodiment differs from the first embodiment in that main gear 80 is biased by leaf spring 87. Like reference numerals denote like parts, and therefore, detailed explanations therefore are omitted. FIG. 11 is a perspective view of steering angle sensor 8 according to the second embodiment of the present invention. FIG. 12 is a diagram of steering angle sensor 8 according to the second embodiment of the present invention as viewed in the axial direction of steering shaft 3. Steering angle sensor 8 according to the second embodiment includes main gear accommodating portion 83c of steering angle sensor housing 83 in which main gear 80 is accommodated, and two engaging grooves 83b formed in a peripheral side wall of main gear accommodating portion 83c. Engaging grooves 83b are cut-out portions spaced apart from each other in a circumferential direction of the peripheral side wall. Leaf spring 87 is engaged in engaging grooves 83b at opposite ends thereof. Leaf spring 87 is a resilient resin member formed into a plate shape. In a compressed state, leaf spring 87 is contacted with a part of a side wall of body portion 80a of main gear 80 which is located on an opposite side of primary detection gear 81 in a radial direction of body portion 80a. With this construction, main gear 80 can be biased in a direction in which main gear 80 comes into meshing engagement with primary detection gear 81.

[Effects]

The second embodiment can attain the following effect in addition to the above effects (1)-(6).

(7) Leaf spring 87 is disposed in steering angle sensor housing 83. Leaf spring 87 is made of a resilient resin material, and biases main gear 80 toward primary detection gear 81 by an elastic force generated in leaf spring 87 to be restored to a natural state thereof.

Accordingly, it is possible to reduce an installation area of leaf spring 87 around steering shaft 3.

Figure 13:
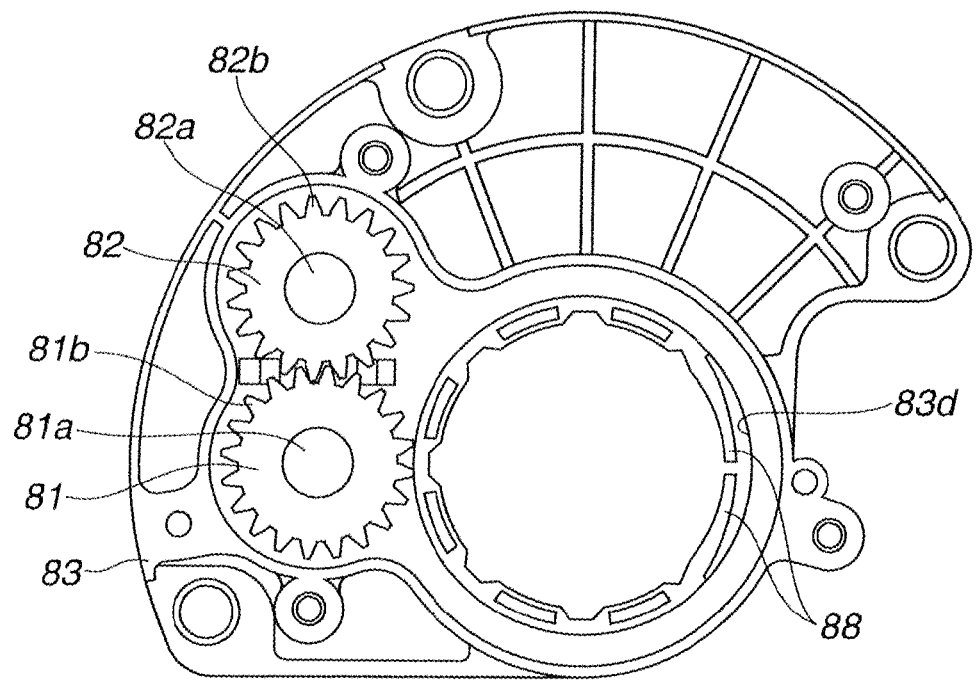
FIG. 13 is a diagram of a steering angle sensor according to a third embodiment of the present invention as viewed from one side in an axial direction of the steering shaft.
Figure 14:
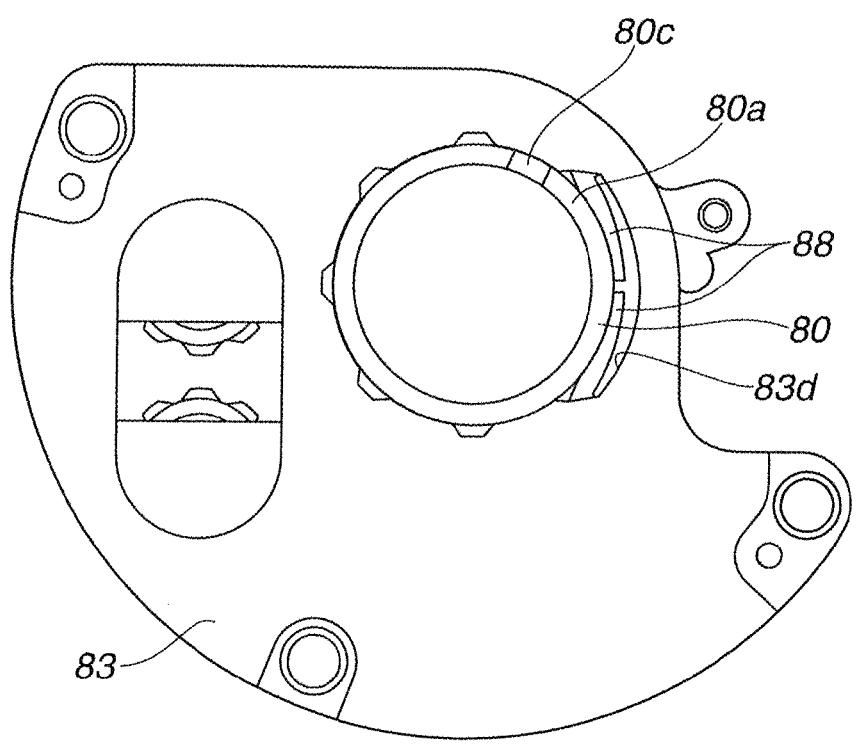
FIG. 14 is a diagram of the steering angle sensor according to the third embodiment of the present invention as viewed from an opposite side in an axial direction of the steering shaft.

[Third Embodiment] Referring to FIG. 13 and FIG. 14, a steering angle sensor according to a third embodiment of the present invention is explained. The third embodiment differs from the first embodiment in that main gear 80 is biased by spring portion 88 formed integrally with steering angle sensor housing 83. Like reference numerals denote like parts, and therefore, detailed explanations therefore are omitted. FIG. 13 is a diagram of steering angle sensor 8 according to the third embodiment of the present invention before mounting main gear 80 to steering angle sensor housing 83 as viewed from one side in the axial direction of steering shaft 3. FIG. 14 is a diagram of steering angle sensor 8 according to the third embodiment of the present invention after mounting main gear 80 to steering angle sensor housing 83 as viewed from an opposite side in the axial direction of steering shaft 3. In steering angle sensor 8 according to the third embodiment, steering angle sensor housing 83 is formed of a resin material by integral molding or insert molding. Steering angle sensor housing 83 includes spring portion 88 formed on an inner peripheral surface that defines through hole 83d of steering angle sensor housing 83 into which main gear 80 is inserted. Spring portion 88 is disposed on an opposite side of primary detection gear 81 in a radial direction of through hole 83d, and extends radially inwardly from the inner peripheral surface of through hole 83d. Spring portion 88 is provided in the form of a pair of arms opposed to each other in a circumferential direction of through hole 83d. Under a condition that main gear 80 is mounted to steering angle sensor housing 83 through through hole 83d, body portion 80a of main gear 80 is biased by spring portion 88 in the direction in which main gear 80 comes into meshing engagement with primary detection gear 81.

[Effects]

The third embodiment can attain the following effect in addition to the above effects (1)-(6).

(8) Steering angle sensor housing 83 is made of a resin material, and spring portion 88 is formed integrally with steering angle sensor housing 83.

With this construction, it is not necessary to provide a biasing member to bias main gear 80 separately from steering angle sensor housing 83. Therefore, the number of parts can be reduced to thereby enhance operating efficiency.

[Fourth Embodiment]

Figure 15:
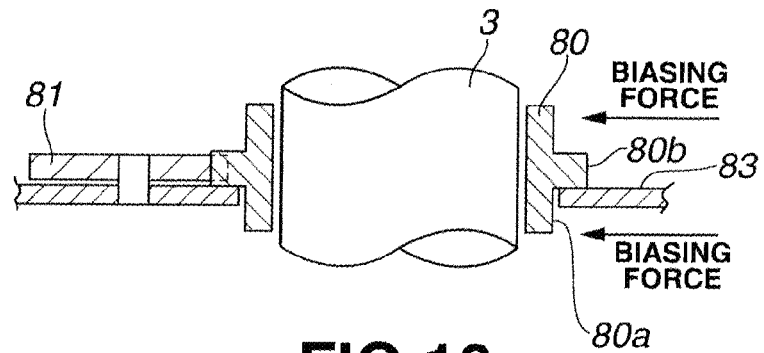
FIG. 15 is a schematic section of the steering shaft, a main gear and a primary detection gear of a steering angle sensor according to a fourth embodiment of the present invention.

Referring to FIG. 15, a steering angle sensor according to a fourth embodiment of the present invention is explained. In the first embodiment, body portion 80a of main gear 80 is biased at a portion located on one side of toothed portion 80b in the axial direction of body portion 80a (on a lower side of toothed portion 80b as shown in FIG. 4). In contrast, in the fourth embodiment, body portion 80a of main gear 80 is biased at axially opposed portions located on both sides of toothed portion 80b in the axial direction of body portion 80a. FIG. 15 is a schematic section of steering shaft 3, main gear 80 and primary detection gear 81 of steering angle sensor 8 according to the fourth embodiment of the present invention. As shown in FIG. 15, each of axially opposed portions of body portion 80a of main gear 80 which are located on both sides of toothed portion 80b in the axial direction of body portion 80a are biased by a biasing member as indicated by arrows. Specifically, one of the axially opposed portions of body portion 80a may be biased by coil spring 86 similarly to the first embodiment, and the other of the axially opposed portions of body portion 80a may be biased by leaf spring 87 similarly to the second embodiment. With this construction, it is possible to suppress lean of main gear 80. Accordingly, a force transmitted from main gear 80 acts on primary detection gear 81 in a direction perpendicular to the rotation axis of primary detection gear 81, so that lean of primary detection gear 81 can be suppressed. As a result, a distance between magnetic member 81a of primary detection gear 81 and magnetoresistance effect element 81c can be kept constant to thereby reduce an error in detection of rotation angle of steering shaft 3.

[Effects]

The fourth embodiment can attain the following effect in addition to the above effects (1)-(7).

(9) Toothed portion 80b of main gear 80 is disposed on the intermediate portion of body portion 80a in the axial direction of body portion 80a, and the biasing member is disposed to bias each of axially opposed portions of body portion 80a which are located on both sides of toothed portion 80b in the axial direction of body portion 80a. With this construction, a force transmitted from main gear 80 acts on primary detection gear 81 in a direction perpendicular to the rotation axis of primary detection gear 81, so that lean of primary detection gear 81 can be suppressed. Accordingly, a distance between magnetic member 81a of primary detection gear 81 and magnetoresistance effect element 81c can be kept constant, and therefore, an error in detection of rotation angle of steering shaft 3 can be reduced.

[Fifth Embodiment]

Figure 16:
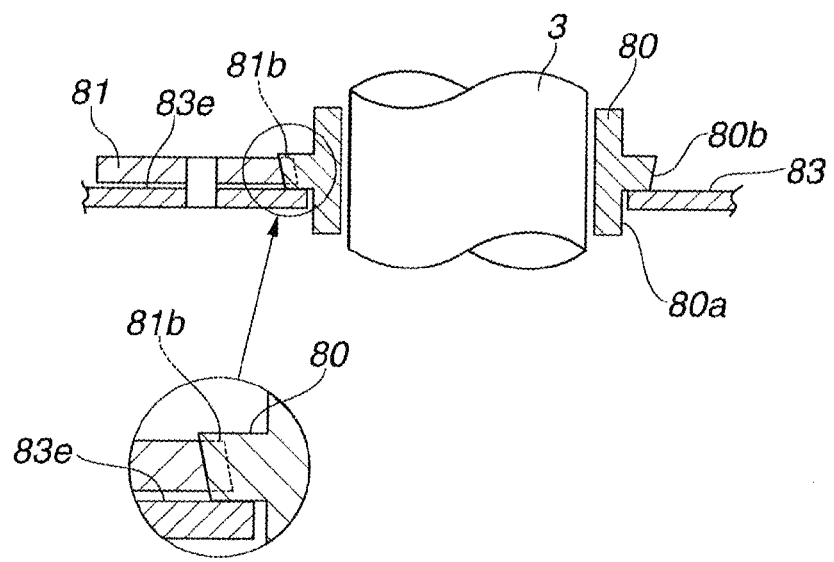
FIG. 16 is a schematic section of the steering shaft, a main gear and a primary detection gear of a steering angle sensor according to a fifth embodiment of the present invention.

Referring to FIG. 16, a steering angle sensor according to a fifth embodiment of the present invention is explained. The fifth embodiment differs from the first embodiment in that teeth 80b of main gear 80 and teeth 81b of primary detection gear 81 are in the form of bevel teeth.

FIG. 16 is a schematic section of steering shaft 3, main gear 80 and primary detection gear 81 of steering angle sensor 8 according to the fifth embodiment of the present invention.

Both teeth 80b of main gear 80 and teeth 81b of primary detection gear 81 are provided in the form of bevel teeth. As shown in FIG. 16, steering angle sensor housing 83 has gear mounting surface 83e on which primary detection gear 81 is mounted. Teeth 80b of main gear 80 are inclined relative to the rotation axis of main gear 80 in a direction in which teeth 80b presses primary detection gear 81 onto gear mounting surface 83e of steering angle sensor housing 83. Teeth 81b of primary detection gear 81 is inclined relative to the rotation axis of primary detection gear 81 in a direction in which teeth 81b is pressed by teeth 80b onto gear mounting surface 83e of steering angle sensor housing 83. With this construction, even in a case where main gear 80 is in a lean state and biased toward primary detection gear 81, primary detection gear 81 can be prevented from lifting from gear mounting surface 83e. Accordingly, it is possible to maintain a constant distance between magnetic member 81a of primary detection gear 81 and magnetoresistance effect element 81c to thereby reduce an error in detection of rotation angle of steering shaft 3.

[Effects]

The fifth embodiment can attain the following effect in addition to the above effects (1)-(6).

(10) Steering angle sensor housing 83 has gear mounting surface 83e on which primary detection gear 81 are mounted. A tooth top of each of teeth 80b of main gear 80 is biased in a direction in which a backlash between main gear 80 and primary detection gear 81 is reduced. The tooth top of each of teeth 80b of main gear 80 has an inclined surface that receives a reaction force from primary detection gear 81 so that main gear 80 is allowed to press primary detection gear 81 onto gear mounting surface 83e through the inclined surface. With this construction, even in a case where main gear 80 is in a lean state and biased toward primary detection gear 81, primary detection gear 81 can be prevented from lifting from gear mounting surface 83e. Accordingly, a distance between magnetic member 81a of primary detection gear 81 and magnetoresistance effect element 81c can be kept constant to thereby reduce an error in detection of rotation angle of steering shaft 3.

[Sixth Embodiment]

Figure 17:
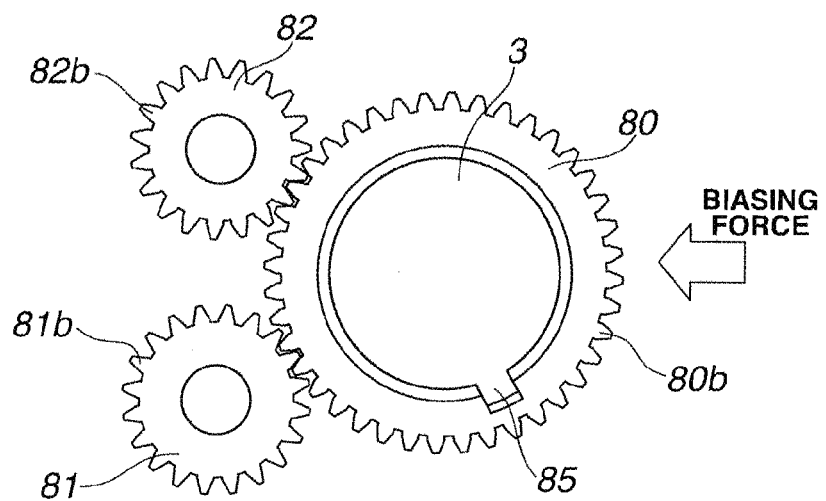
FIG. 17 is a schematic diagram of a steering angle sensor according to a sixth embodiment of the present invention.

Referring to FIG. 17, a steering angle sensor according to a sixth embodiment of the present invention is explained. The sixth embodiment differs from the first embodiment in arrangement of primary detection gear 81 and secondary detection gear 82 and meshing relation between main gear 80, primary detection gear 81 and secondary detection gear 82. FIG. 17 is a schematic diagram of steering angle sensor 8 according to the sixth embodiment of the present invention. As shown in FIG. 17, primary detection gear 81 and secondary detection gear 82 are spaced from each other to be out of contact with each other. Main gear 80 is biased in a direction in which main gear 80 meshes with both primary detection gear 81 and secondary detection gear 82. With this construction, it is possible to suppress a backlash between main gear 80 and primary detection gear 81 and a backlash between main gear 80 and secondary detection gear 82, so that an error in detection of rotation angle of steering shaft 3 can be reduced. In addition, secondary detection gear 82 is directly contacted with main gear 80, so that an error in detection of rotation angle of steering shaft 3 through secondary detection gear 82 can be reduced. Accordingly, it is possible to enhance accuracy in detection of rotation angle of steering shaft 3.

Further, the biasing member of each of the first to the fourth embodiments may be used in the sixth embodiment. Further, the construction of the fifth embodiment may be used in the sixth embodiment.

[Effects]

The sixth embodiment can attain the following effects in addition to the above effects (2)-(4) and (7)-(10).

(11) The steering angle sensor for a vehicle according to the sixth embodiment of the present invention includes steering angle sensor housing 83 disposed on steering shaft 3 that is rotatable in accordance with an operation of steering wheel 2; main gear (first gear) 80 rotatably disposed in steering angle sensor housing 83, the main gear 80 including annular body portion 80a formed to surround steering shaft 3, a plurality of teeth (toothed portion) 80b formed on an outer peripheral side of body portion 80a, and engaging portion 80c formed in body portion 80a, the main gear (first gear) 80 having an inner peripheral surface configured to be spaced from steering shaft 3 at a predetermined distance in a radial direction thereof; rotation transmitting portion 85 disposed on steering shaft 3 so as to make a unitary rotation with steering shaft 3, the rotation transmitting portion 85 having counterpart engaging portion 85a engaged with engaging portion 80c of main gear 80 to rotationally drive main gear 80 in accordance with rotation of steering shaft 3; primary detection gear (second gear) 81 rotatably disposed in steering angle sensor housing 83, the primary detection gear 81 including magnetic member 81a having N pole and S pole disposed in a circumferential direction of magnetic member 81a at predetermined intervals, and a plurality of teeth (toothed portion) 81b formed on an outer peripheral side of primary detection gear 81 to mesh with teeth 80b of main gear 80; secondary detection gear (third gear) 82 rotatably disposed in steering angle sensor housing 83, the secondary detection gear 82 including magnetic member 82a having N pole and S pole disposed in a circumferential direction of magnetic member 82a at predetermined intervals, and a plurality of teeth (toothed portion) 82b formed on an outer peripheral side of secondary detection gear 82 to mesh with teeth 80b of main gear 80 in which a number of the plurality of teeth 82b is set to a value indivisible by a number of the plurality of teeth 81b of primary detection gear 81 to determine a predetermined speed reducing ratio; magnetoresistance effect element (first element) 81c that detects a first rotation angle as a rotation angle of primary detection gear 81 by detecting a change of magnetic field generated by magnetic member 81a to determine a change of resistance value of a resistance element; magnetoresistance effect element (second element) 82c that detects a second rotation angle as a rotation angle of secondary detection gear 82 by detecting a change of magnetic field generated by magnetic member 82a to determine a change of resistance value of a resistance element; and a biasing member disposed in steering angle sensor housing 83 to bias main gear 80 in a direction in which main gear 80 meshes with both primary detection gear 81 and secondary detection gear 82 so as to reduce a backlash between main gear 80 and primary detection gear 81 and a backlash between main gear 80 and secondary detection gear 82, wherein the first rotation angle and the second rotation angle are combined to determine an absolute steering angle indicative of an amount of rotation of steering wheel 2 when steering wheel 2 is rotated from a neutral position in which steerable road wheel 13 is oriented to a straight ahead direction of the vehicle. Since main gear 80 is biased in the direction in which main gear 80 meshes with both primary detection gear 81 and secondary detection gear 82, a backlash between main gear 80 and primary detection gear 81 and a backlash between main gear 80 and secondary detection gear 82 can be suppressed. As a result, an error in detection of rotation angle of steering shaft 3 can be reduced.

Further, main gear 80 and secondary detection gear 82 are in direct contact with each other, and therefore, it is possible to reduce an error in detection of rotation angle of steering shaft 3 through secondary detection gear 82.

(12) Coil spring 86 is formed into an annular shape to surround the outer periphery of body portion 80a of main gear 80. Coil spring 86 is contacted with body portion 80a on one peripheral portion side thereof and engaged with steering angle sensor housing 83 on the other peripheral portion side thereof located diametrically opposed to the one peripheral portion in a circumferential direction of coil spring 86. Coil spring 86 biases main gear 80 toward primary detection gear 81 and secondary detection gear 82 by applying an elastic force to main gear 80 in such a manner that a diameter of coil spring 86 is reduced. With this construction, it is possible to reduce an installation volume of coil spring 86.

[Other Embodiments]

In the above embodiments, magnetoresistance effect elements (MR elements) 81c, 82c are used as elements to detect a change in magnetic field of magnetic members 81a, 82a. However, each of the elements is not particularly limited to the magnetoresistance effect elements. A giant magnetoresistance effect element (GMR element), a Hall element, etc. may be used.

This application is based on a prior Japanese Patent Application No. 2013-015973 filed on Jan. 30, 2013. The entire contents of the Japanese Patent Application No. 2013-015973 are hereby incorporated by reference.

Although the invention has been described above by reference to certain embodiments and modifications of the invention, the invention is not limited to the embodiment described above. Further modifications and variations of the embodiments and modifications described above will occur to those skilled in the art in light of the above teachings. The scope of the invention is defined with reference to the following claims.

What is claimed is:

1. A steering angle sensor for a vehicle, the steering angle sensor comprising:

a steering angle sensor housing disposed on a steering shaft that is rotated in accordance with an operation of a steering wheel;

a first gear rotatably disposed in the steering angle sensor housing, the first gear including an annular body portion formed to surround the steering shaft, a plurality of teeth formed on an outer peripheral side of the body portion, and an engaging portion formed in the body portion, the first gear having an inner peripheral surface configured to be spaced from the steering shaft at a predetermined distance in a radial direction of the steering shaft;

a rotation transmitting portion disposed on the steering shaft so as to make a unitary rotation with the steering shaft, the rotation transmitting portion having a counterpart engaging portion engaged with the engaging portion of the first gear to rotationally drive the first gear in accordance with rotation of the steering shaft;

a second gear rotatably disposed in the steering angle sensor housing, the second gear including a magnetic member having N pole and S pole disposed in a circumferential direction of the magnetic member at predetermined intervals, and a plurality of teeth formed on an outer peripheral side of the second gear to mesh with the plurality of teeth of the first gear;

a third gear rotatably disposed in the steering angle sensor housing, the third gear including a magnetic member having N pole and S pole disposed in a circumferential direction of the magnetic member at predetermined intervals, and a plurality of teeth formed on an outer peripheral side of the third gear to mesh with the plurality of teeth of the first gear or the plurality of teeth of the second gear in which a number of the plurality of teeth of the third gear is set to be indivisible by a number of the plurality of teeth of the second gear to provide a desired speed reducing ratio between the second gear and the third gear;

a first magnetoresistance effect element that detects a first rotation angle as a rotation angle of the second gear by detecting a change of magnetic field generated by the magnetic member of the second gear to determine a change of resistance value of a resistance element of the first magnetoresistance effect element;

a second magnetoresistance effect element that detects a second rotation angle as a rotation angle of the third gear by detecting a change of magnetic field generated by the magnetic member of the third gear to determine a change of resistance value of a resistance element of the second magnetoresistance effect element; and a biasing member disposed in the steering angle sensor housing to bias the first gear toward the second gear so as to reduce a backlash between the first gear and the second gear, wherein the first rotation angle and the second rotation angle are combined to determine an absolute steering angle indicative of an amount of rotation of the steering wheel when the steering wheel is rotated from a neutral position in which a steerable road wheel is oriented to a straight ahead direction of the vehicle.

2. The steering angle sensor as claimed in claim 1, wherein the first gear is disposed such that a rotation axis of the first gear after being biased by the biasing member is located closer to a rotation axis of the steering shaft than the rotation axis of the first gear before being biased by the biasing member.

3. The steering angle sensor as claimed in claim 1, wherein the body portion of the first gear is configured to be out of contact with the steering shaft under a condition that the first gear is biased by the biasing member.

4. The steering angle sensor as claimed in claim 1, wherein the second rotation angle is used to determine a number of rotation of the steering shaft when the steering shaft is rotated from the neutral position, and the first rotation angle is used to determine a rotation angle of the steering shaft within one revolution of the steering shaft.

5. The steering angle sensor as claimed in claim 1, wherein the biasing member is formed into an annular shape to surround an outer periphery of the body portion of the first gear, the biasing member is contacted with the body portion of the first gear in one peripheral portion side thereof and engaged with the steering angle sensor housing on another peripheral portion side thereof located diametrically opposed to the one peripheral portion side in a circumferential direction of biasing member, and the biasing member biases the first gear toward the second gear by applying an elastic force to the first gear in such a manner that a diameter of the biasing member is reduced.

6. The steering angle sensor as claimed in claim 1, wherein the biasing member is made of a resilient resin material and biases the first gear toward the second gear by an elastic force generated in the biasing member to be restored to a natural state thereof.

7. The steering angle sensor as claimed in claim 6, wherein the steering angle sensor housing is made of a resin material, and a biasing member spring portion is formed integrally with the steering angle sensor housing.

8. The steering angle sensor as claimed in claim 1, wherein the plurality of teeth of the first gear are disposed on an intermediate portion of the body portion in an axial direction of the body portion, and the biasing member is disposed to bias each of axially opposed portions of the body portion which are located on both sides of the plurality of teeth of the first gear in the axial direction of the body portion.

9. The steering angle sensor as claimed in claim 1, wherein the steering angle sensor housing has a gear mounting surface on which the second gear is mounted, a tooth top of each of the plurality of teeth of the first gear is biased in a direction in which the backlash between the first gear and the second gear is reduced, and the tooth top of each of the plurality of teeth of the first gear has an inclined surface that receives a reaction force from the second gear so that the first gear is allowed to press the second gear onto the gear mounting surface through the inclined surface.

10. The steering angle sensor as claimed in claim 1, wherein the third gear meshes with the second gear to be rotationally driven.

11. A steering angle sensor for a vehicle, the steering angle sensor comprising:
a steering angle sensor housing disposed on a steering shaft that is rotated in accordance with an operation of a steering wheel;
a first gear rotatably disposed in the steering angle sensor housing, the first gear including an annular body portion formed to surround the steering shaft, a plurality of teeth formed on an outer peripheral side of the body portion, and an engaging portion formed in the body portion, the first gear having an inner peripheral surface configured to be spaced from the steering shaft at a predetermined distance in a radial direction of the steering shaft;
a rotation transmitting portion disposed on the steering shaft so as to make a unitary rotation with the steering shaft, the rotation transmitting portion having a counterpart engaging portion engaged with the engaging portion of the first gear to rotationally drive the first gear in accordance with rotation of the steering shaft;
a second gear rotatably disposed in the steering angle sensor housing, the second gear including a magnetic member having N pole and S pole disposed in a circumferential direction of the magnetic member at predetermined intervals, and a plurality of teeth formed on an outer peripheral side of the second gear to mesh with the plurality of teeth of the first gear;
a third gear rotatably disposed in the steering angle sensor housing, the third gear including a magnetic member having N pole and S pole disposed in a circumferential direction of the magnetic member at predetermined intervals, and a plurality of teeth formed on an outer peripheral side of the third gear to mesh with the plurality of teeth of the first gear in which a number of the plurality of teeth of the third gear is set to be indivisible by a number of the plurality of teeth of the second gear to provide a desired speed reducing ratio between the second gear and the third gear;
a first magnetoresistance effect element that detects a first rotation angle as a rotation angle of the second gear by detecting a change of magnetic field generated by the magnetic member of the second gear to determine a change of resistance value of a resistance element of the first magnetoresistance effect element;
a second magnetoresistance effect element that detects a second rotation angle as a rotation angle of the third gear by detecting a change of magnetic field generated by the magnetic member of the third gear to determine a change of resistance value of a resistance element of the second magnetoresistance effect element; and
a biasing member disposed in the steering angle sensor housing to bias the first gear in a direction in which the first gear meshes with both the second gear and the third gear so as to reduce a backlash between the first gear and the second gear and a backlash between the first gear and the third gear,
wherein the first rotation angle and the second rotation angle are combined to determine an absolute steering angle indicative of an amount of rotation of the steering wheel when the steering wheel is rotated from a neutral position in which a steerable road wheel is oriented to a straight ahead direction of the vehicle.

12. The steering angle sensor as claimed in claim 11, wherein the first gear is disposed such that a rotation axis of the first gear after being biased by the biasing member is located closer to a rotation axis of the steering shaft than the rotation axis of the first gear before being biased by the biasing member.

13. The steering angle sensor as claimed in claim 11, wherein the body portion of the first gear is configured to be out of contact with the steering shaft under a condition that the first gear is biased by the biasing member.

14. The steering angle sensor as claimed in claim 11, wherein the second rotation angle is used to determine a number of rotation of the steering shaft when the steering shaft is rotated from the neutral position, and the first rotation angle is used to determine a rotation angle of the steering shaft within one revolution of the steering shaft.

15. The steering angle sensor as claimed in claim 11, wherein the biasing member is formed into an annular shape to surround an outer periphery of the body portion of the first gear, the biasing member is contacted with the body portion of the first gear in one peripheral portion side thereof and engaged with the steering angle sensor housing on another peripheral portion side thereof located diametrically opposed to the one peripheral portion side in a circumferential direction of biasing member, and the biasing member biases the first gear toward the second gear and the third gear by applying an elastic force to the first gear in such a manner that a diameter of the biasing member is reduced.

16. The steering angle sensor as claimed in claim 11, wherein the biasing member is made of a resilient resin material and biases the first gear toward the second gear and the third gear by an elastic force generated in the biasing member to be restored to a natural state thereof.

17. The steering angle sensor as claimed in claim 16, wherein the steering angle sensor housing is made of a resin material, and a biasing member spring portion is formed integrally with the steering angle sensor housing.

18. The steering angle sensor as claimed in claim 11, wherein the plurality of teeth of the first gear are disposed on an intermediate portion of the body portion in an axial direction of the body portion, and the biasing member is disposed to bias each of axially opposed portions of the body portion which are located on both sides of the plurality of teeth of the first gear in the axial direction of the body portion.

19. The steering angle sensor as claimed in claim 11, wherein the steering angle sensor housing has a gear mounting surface on which the second gear and the third gear are mounted, a tooth top of each of the plurality of teeth of the first gear is biased in a direction in which the backlash between the first gear and the second gear and the backlash between the first gear and the third gear are reduced, and the tooth top of each of the plurality of teeth of the first gear has an inclined surface that receives a reaction force from the second gear and the third gear so that the first gear is allowed to press the second gear and the third gear onto the gear mounting surface through the inclined surface.

* * * * *